US012587987B2

(12) United States Patent
Van Hecke et al.

(10) Patent No.: US 12,587,987 B2
(45) Date of Patent: Mar. 24, 2026

(54) METHOD AND SYSTEM FOR IMPROVED CLOCK SYNCHRONIZATION

(71) Applicant: POZYX N.V., Ledeberg (BE)

(72) Inventors: Jeroen Van Hecke, Ledeberg (BE); Michiel Boes, Ledeberg (BE); Samuel Van De Velde, Ledeberg (BE)

(73) Assignee: POZYX N.V., Ledeberg (BE)

( * ) Notice: Subject to any disclaimer, the term of this patent is extended or adjusted under 35 U.S.C. 154(b) by 589 days.

(21) Appl. No.: 17/799,987

(22) PCT Filed: Feb. 19, 2020

(86) PCT No.: PCT/EP2020/054394
§ 371 (c)(1),
(2) Date: Aug. 16, 2022

(87) PCT Pub. No.: WO2021/164869
PCT Pub. Date: Aug. 26, 2021

(65) Prior Publication Data
US 2023/0072580 A1     Mar. 9, 2023

(51) Int. Cl.
*H04W 56/00*     (2009.01)
*G06F 1/12*      (2006.01)

(52) U.S. Cl.
CPC ............ *H04W 56/002* (2013.01); *G06F 1/12* (2013.01)

(58) Field of Classification Search
CPC .... H04W 56/002; H04W 56/0005; G06F 1/12
See application file for complete search history.

(56) References Cited

U.S. PATENT DOCUMENTS 9,954,669 B2     4/2018  Perez-Cruz et al.
2007/0171125 A1*  7/2007  Abraham ................ G01S 19/42
                                            342/357.62
(Continued)

FOREIGN PATENT DOCUMENTS

CN      110099354 A  *  8/2019  ............ H04W 4/023
CZ          31245 U1    11/2017

OTHER PUBLICATIONS

Machine translated English version of CN 110099354 A retrieved from PE2E on Mar. 12, 2025 (Year: 2019).*
(Continued)

*Primary Examiner* — Joseph E Avellino
*Assistant Examiner* — Adam Joel Cerlanek
(74) *Attorney, Agent, or Firm* — Cermak & McGowan LLP; Malcolm K. McGowan

(57)          ABSTRACT

The invention relates to a method for clock synchronization of a plurality of electronic devices, wherein each of the devices comprises a respective local clock having a respective clock rate and a respective clock offset; wireless communication means for transmitting and receiving packets to and from the other devices; second communication means for connecting to a server; said method comprising the steps of: for each respective of the devices, controlling the device to transmit at least two respective measurement packets via said wireless connection means and generate respective local transmission timestamps based on the respective local clock of the device; for each respective of said transmitted measurement packets, controlling at least one device different from the transmitting device to, upon receipt of the transmitted measurement packet via said wireless connection means, generate a respective local reception timestamp based on the respective local clock of the respective device; and further steps relating to transmitting of the local transmission and reception timestamps to the server, and to (Continued)

calculating, by the server, the clock rates and the clock offsets.

12 Claims, 2 Drawing Sheets

(56) References Cited

U.S. PATENT DOCUMENTS

| | | | |
|---|---|---|---|
| 2012/0120874 A1 | 5/2012 | McLaughlin et al. | |
| 2014/0314068 A1 | 10/2014 | Wentink et al. | |
| 2020/0018813 A1* | 1/2020 | Olsen | G01S 5/021 |
| 2020/0137699 A1* | 4/2020 | Girardier | H04W 56/001 |

OTHER PUBLICATIONS

Machine-translated English version of CN 110099354 A1 retrieved from PE2E on Mar. 12, 2025 (Year: 2019).*
International Search Report for PCT Patent App. No. PCT/EP2020/054394 (Nov. 13, 2020).
Written Opinion for PCT Patent App. No. PCT/EP2020/054394 (Nov. 13, 2020).

\* cited by examiner

METHOD AND SYSTEM FOR IMPROVED CLOCK SYNCHRONIZATION

This application is a national phase entry under 35 U.S.C. § 371 of PCT Patent Application No. PCT/EP2020/054394, filed on Feb. 19, 2020, which is incorporated by reference.

FIELD OF THE INVENTION

The present invention relates to clock synchronization of a plurality of electronic devices comprising wireless communication means for transmitting and receiving packets to and from the other devices. In embodiments, the wireless communication relates to Ultra-Wideband (UWB).

BACKGROUND ART

In many applications, including positioning, network and packet monitoring, network security, authentication protocols and real-time media streaming, it is important to share a common reference clock. Clock synchronization is a critical component providing a common time frame to different devices. It may be an enabling aspect for applications such as fusing voice and video data from different devices, time-based channel sharing, and coordinated sleep wake-up device scheduling mechanisms.

Clock synchronization is particularly critical for real-time locating systems (RTLS), relating to systems and methods to identify and/or track the location of objects or people in real-time. For instance, the devices may be UWB anchors or access points that locate mobile tags using a time difference of arrival method as known to the skilled person. The precision of this method critically depends on careful synchronization of the local clocks of the involved electronic devices.

It has been found that in the prior art that clock synchronization may be achieves using wired distribution of a master clock signal to each device; but such an implementation is relatively expensive to install and relatively difficult thereafter to modify the physical configuration of the devices.

US20120120874A1, U.S. Pat. No. 9,954,669B2 and US20140314068A1 disclose methods and systems which have at least part of the synchronization handled wirelessly, but are complex and may lack robustness with respect to single device failures and/or may lack scalability and/or may lead to slow synchronization.

CZ31245U1 discloses related methods and systems involving wired Ethernet-based as well as wireless communication means, but is overly complex.

Accordingly, a method and related apparatus for synchronization of all network clock timebases using only wireless transmissions is desirable.

SUMMARY OF THE INVENTION

It is an aim of the present invention to provide clock synchronization of devices that does not require calibration of the devices with respect to location.

It is a further aim of the invention to provide clock synchronization that is scalable, simple, and robust.

It is a further aim of the present invention to provide clock synchronization that reduces requirements on the devices, leading to simpler and more cost-effective devices.

It is a further aim of the present invention to provide clock synchronization that is fast and reliable.

The invention provides, according to a first aspect, a method for clock synchronization of a plurality of electronic devices, preferably at least three electronic devices, wherein each of the devices comprises:

a respective local clock having a respective clock rate and a respective clock offset;

wireless communication means for transmitting and receiving packets to and from the other devices of said plurality of devices;

second communication means for connecting to a server; said method comprising the steps of:

for each respective of the devices, controlling the device to transmit at least one, preferably at least two, respective measurement packets via said wireless connection means and generate respective local transmission timestamps based on the respective local clock of the device;

for each respective of said transmitted measurement packets, controlling at least one device different from the transmitting device to, upon receipt of the transmitted measurement packet via said wireless connection means, generate a respective local reception timestamp based on the respective local clock of the respective device;

for each device and for each respective of said transmitted measurement packets, controlling the transmitting device to transmit the local transmission timestamp to the server via the second connection means;

for each respective of said transmitted measurement packets, controlling the at least one receiving device to transmit the local reception timestamp to the server via the second connection means;

calculating, by the server, the clock rates and the clock offsets of each of the plurality of respective devices based on the received local transmission timestamps and the received local reception timestamps.

In a preferred embodiment, said calculating of the clock rates and the clock offsets is performed after reception by the server of each of said local transmission timestamps and each of said local reception timestamps, and/or, related, after expiry of some predetermined period for indicating that timestamps have been received for all measurement packets that have actually been transmitted and/or have actually been received, which may, e.g., account for loss of one or more measurement packets due to noisy environments inherent to wireless channels.

In embodiments, the number of measurement packets transmitted per device may be chosen higher or lower and may be differentiated across devices. In embodiments, said choosing of the number of measurement packets and/or said differentiation relates to meeting a pre-determined criterion to ensure that sufficient measurement data is available to calculate each respective of the clock rates and clock offsets of the respective devices. In embodiments, choosing of the number of measurement packets and/or said differentiation relates to choosing a number high enough to be resilient with respect to some level of packet loss. Thereby, embodiments wherein each of the devices transmits two or at least two respective measurement packets corresponds to examples whereby sufficient measurement data is available to calculate each respective of the clock rates and clock offsets of the respective devices even in the presence of some packet loss.

The present invention provides the advantage that it is calibration-less, i.e. it does not require the position of any of the devices to be known. In fact, neither the absolute nor the relative position of any of the devices or the server is required for performing clock synchronization of the plurality of devices, enhancing the ease of use and robustness with respect to motion or dislocation of any of the devices or the server.

The present invention achieves better performance over the prior art in that it is more robust to the circumstances inherent to wireless communication. Wireless channels being inherently noisy, robustness to loss of measurement packets is a prime design criterion. Additionally, the physical environment in which devices such as anchors are located may lead to excessive physical distance between two devices and/or channels between devices which are non-line-of sight and/or to multipath channels between devices, leading to loss of measurement packets and/or even the impossibility to use one or more of the devices, equivalent to device failure.

Another advantage of the invention is the interchangeable role of the devices. By having each of the devices transmit measurement packets and having the measurement packets received by any of the other devices, there is no reliance on any single of the devices as "master", making the method less prone to failures of a single device, hence leading to more robustness with respect to device failures.

Related, the method does not rely on pair-wise synchronization, as is the case for, e.g., US20120120874A1 and U.S. Pat. No. 9,954,669B2. Such pair-wise synchronization critically relies on valid synchronization of each of the device pairs involved, making it prone to errors, whereby a single failure of a device of a first pair leads to failing of synchronization of any pair reliant on said first pair. By avoiding a pair-wise approach, the present invention hence provides more robustness against device failure.

Additionally, since subsequent pairing according to, e.g., US20120120874A1 or U.S. Pat. No. 9,954,669B2, involves multiple pairing steps, the overall process of synchronization is time-consuming. Moreover, each pairing step involves at least one "handshake" between devices, relating to a two-way transmission, and even two handshakes for US20120120874A1 or U.S. Pat. No. 9,954,669B2. Each such handshake involves a first substep, wherein the first device transmits a first message to a second device, and a second substep, wherein the second device, upon complete receipt of the first message, transmits a second message to the first device in reply to the first message. Since the second substep can only be carried out after the first message has been received in full and has been processed, this process is prone to significant delays. For instance, the method disclosed in U.S. Pat. No. 9,954,669B2, which involves at least two two-way transmissions among a pair to synchronize a single pair, discloses that such at least two two-way transmissions may require 0.5 s to 1 s. Thereby, synchronization between anchors according to U.S. Pat. No. 9,954,669B2 for more than two anchors requires repeating single pair synchronization for each suitable anchor pair, i.e. pair-by-pair "sequential" synchronization, leading to a total synchronization time of (much) more than a second, especially if the number of anchor pairs is large. This contrasts with the present invention, providing enhanced speed of synchronization and improved scalability, by providing synchronization "in parallel" for all devices. Particularly, the present invention provides synchronization that relies on multiple one-way transmissions of packets from one device to another, without any requirement of "handshake" between devices, thereby significantly reducing complexity and avoiding the delays relating to round-trip-times and processing.

Furthermore, repeating single pair synchronization for each suitable anchor pair, as is disclosed in, e.g., US20120120874A1 and U.S. Pat. No. 9,954,669B2, also leads to larger vulnerability with respect to packet loss in noisy environments. Indeed, such a way of synchronization requires, according to U.S. Pat. No. 9,954,669B2, two two-way transmissions between each pair, which is a more stringent requirement than that required by the present invention. By having three or more devices synchronize according to the invention, synchronization may take place even if the strict requirement of two two-way transmissions between each of the pairs is not met. Rather, the present invention requires a less strict criterion to be met, wherein accuracy of the calculation of clock rates and clock offsets increases along with the number of local transmission timestamps and local reception timestamps that is received by the server. As long as a sufficient number of packets is transmitted, e.g. two, and most of the transmitted measurement packets are actually received by at least one other device, the present invention provides successful completion of synchronization of all devices.

With respect to said criterion, in embodiments, a sufficient criterion for synchronization is provided by fulfilling following two conditions:

for each device i, a device j1 different from i should exist with which at least two measurement packets are exchanged according to a single direction, i.e. either from i to j1 or from j1 to i; and for each device i, a device j2 different from i should exist with which at least one measurement packet is exchanged in each direction, i.e. at least one from i to j2 and one from j2 to i;

wherein j1 and j2 may be different devices but may also be the same device. This criterion may also be, e.g., related to Example 2, where the rate equations correspond to the first condition, and the offset equations correspond to the second condition. For both conditions, the criterion may be understood as a requirement for the involved graph defined by the plurality of devices, the requirement being that the graph is connected. Such a criterion is less stringent than the two two-way synchronizations required by US20120120874A1 and U.S. Pat. No. 9,954,669B2. Accordingly, the present invention enables more robustness with respect to packet loss than the synchronization disclosed in US20120120874A1 and U.S. Pat. No. 9,954,669B2.

Finally, synchronization according to the present invention may optionally involve adjusting of local clocks but does not require it. Related, devices are not required to perform calculations relating to synchronization. This makes synchronization simpler and faster than the approaches disclosed in, e.g., CZ31245U1, CZ31246U1, U.S. Pat. No. 9,954,669B2 and US20140314068A1, which are overly complex. Hence, synchronization according to the invention leads to reduced requirements on the devices, shifting calculation burden to the server and alleviating the need of active clock management means at the devices, and hence enables cheaper devices.

In a second aspect, which may be combined with the other aspects and embodiments described herein, the invention provides a system comprising a server;

a plurality of electronic devices, said plurality comprising at least three devices, each comprising a respective local clock having a respective clock rate and a respective clock offset;

wireless communication means for transmitting and receiving packets to and from other devices of said plurality of devices;

second communication means for connecting to said server;

wherein said server is configured for performing a method for clock synchronization of said plurality of electronic devices, said method comprising the steps of for each respective of the devices, controlling the device to transmit at least one, preferably at least two, respective measurement packets via said wireless connection means and generate respective local transmission timestamps based on the respective local clock of the device;

for each respective of said transmitted measurement packets, controlling at least one device different from the transmitting device to, upon receipt of the transmitted measurement packet via said wireless connection means, generate a respective local reception timestamp based on the respective local clock of the respective device;

for each device and for each respective of said transmitted measurement packets, controlling the transmitting device to transmit the local transmission timestamp to the server via the second connection means;

for each respective of said transmitted measurement packets, controlling the at least one receiving device to transmit the local reception timestamp to the server via the second connection means;

calculating, by the server, the clock rates and the clock offsets of each of the plurality of respective devices based on the received local transmission timestamps and the received local reception timestamps, wherein preferably said calculating of the clock rates and the clock offsets is performed after reception of each of said generated local transmission timestamps and each of said generated local reception timestamps;

wherein each of said plurality of devices is configured for performing the steps of:

upon receiving transmission instructions from said server via said second communication means, transmitting measurement packets via said wireless connection means and generating respective local transmission timestamps based on the local clock;

upon receiving transmitted measurement packets via said wireless connection means, generating respective local reception timestamps based on the local clock;

transmit the generated local transmission timestamps to the server via the second connection means;

transmit the generated local reception timestamps to the server via the second connection means.

In a third aspect, which may be combined with the other aspects and embodiments described herein, the invention provides a non-transient storage device, comprising computer-executable instructions which, when executed on a processor, cause the processor to perform the method of the invention.

Various embodiments and their advantages are described in the description and by the dependent claims.

BRIEF DESCRIPTION OF THE DRAWINGS

The present invention will be discussed in more detail below, with reference to the attached drawings.

DESCRIPTION OF EMBODIMENTS

Figure 1:
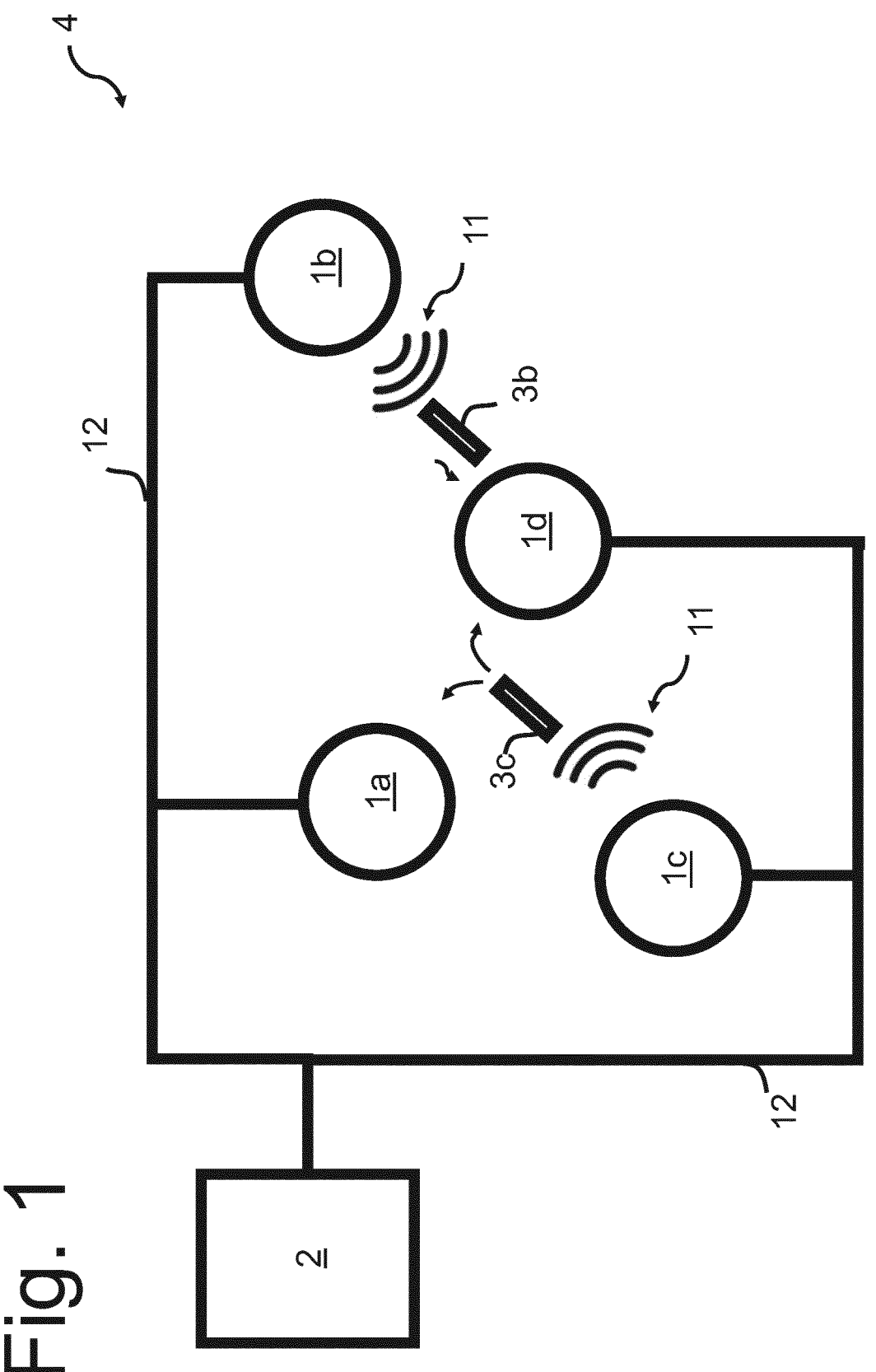
FIG. 1 shows an example embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

In this document, the term "RTLS" refers to real-time locating system, a system to identify and/or track the location of objects or people in real-time.

In this document, the term "server" may refer to a local non-distributed machine comprising one or more processors, but may equally refer to a server system distributed over a plurality of remote locations, wherein, at each location, one or more machines belonging to the server system and each comprising one or more processors may be located. The server may be distinguished from the plurality of devices or the tag but may also be integrated in one of them, or even be one of the devices or the tag.

The plurality of devices of the invention may each be different from each other. In preferred embodiments, at least two of the devices are interchangeable within the context of the invention; more preferably each of the devices are interchangeable.

In the document, the term "tag" may refer to any device configured to receive and/or to transmit packets via the wireless interface. In embodiments, some or all of the one or more tags belong to the plurality of devices. In embodiments, one or more or all of the tags do not belong to the plurality of devices. Furthermore, in embodiments, the tag is not connected to the server and/or does not exchange data over the second connection means. In embodiments, one or more of the tags comprise a battery or equivalent energy source, e.g., a energy harvesting means. In embodiments, one or more of the tags are a completely wireless device operating on battery. In embodiments, one or more of the tag are connected to the server via the second connection means.

In this document, the term IMU refers to an electronic device that measures and reports data with respect to a body with which it is associated, the data relating to one or more of: a body's specific force, angular rate, and/or the orientation of the body. In embodiments, the data is determined based on measurement performed by means of one or more of an accelerometer, a gyroscope, and/or a magnetometer.

In embodiments, the wireless communication means may related to any or any combination of Wi-Fi, 3G, 4G, 5G, HDSPA, LTE, RF, NFC, IEEE 802.11a, b, g, n, ac, or ad, Bluetooth®, WiMAX®, ZigBee®, or UWB. In preferred embodiments, the wireless communication means relates to UWB.

In embodiments, the step of calculating the clock rates and the clock offsets comprises the substeps of:

(a) calculating the clock rates of each of the plurality of respective devices based at least on the received local transmission timestamps and the received local reception timestamps;

(b) calculating the clock offsets of each of the plurality of respective devices based on at least the received local transmission timestamps, the received local reception timestamps, and preferably further based on the clock rates calculated in substep (b).

This has the advantage of combining calculations relating to all the devices in modular steps performed by the server, alleviating the burden on the devices. In embodiments, said substep (b) is carried out after completion of substep (a), wherein preferably the calculating of the clock offsets is further based on the calculated clock rates, enhancing modularity and simplicity of implementation.

In embodiments, the calculating of the clock offsets of substep (b) is based on the received local transmission timestamps, the received local reception timestamps and the calculated clock rates solely through coefficients $o_{i,j}$ wherein $o_{i,j}$ is proportional to $\gamma_j([\tau^A_{1,j}]\_\tau_{j,ref}+[\tau^T_{2,j}]\_\tau_{j,ref})-\gamma_i([\tau^T_{1,i}]\_\tau_{i,ref}+[\tau^A_{2,i}]\_\tau_{i,ref})$;

wherein $\gamma_i$ denotes the clock rate of device i, i=1, . . . , N; wherein N is the number of devices;

$\tau^T_{k,i}$ denotes the local transmission timestamp corresponding to the $k^{th}$ measurement that is transmitted by device i;

$\tau^A_{k,j}$, shorthand for $\tau^A_{k,i,j}$, denotes the local reception timestamp corresponding to the $k^{th}$ measurement that is transmitted by device i and received by device j; and $[\tau_i]\_\tau_{i,ref}$ denotes $(\tau_i-\tau_{i,ref})$ modulo $\tau_M$; wherein $\tau_{i,ref}$ denotes a reference timestamp for overflow compensation of device i, and $\tau_M$ denotes a maximal timestamp relating to overflow.

Such a simple representation in terms of coefficients $o_{i,j}$ provides a large reduction of computational burden when compared to prior art methods and systems, since the computation merely relates to sums, substractions and products of a limited number of real-valued variables, leading to faster synchronization. Moreover, the representation is generic in terms of number of packets actually received, and hence, the choice of number of measurement packets may be altered without requiring a different representation, leading to increased flexibility in implementation.

In embodiments, the method comprises the further steps of receiving, at the server, a local timestamp from one of the devices through said second communication means, wherein said local timestamp is based on the local clock of the device;

calculating, by the server, the time t being the local timestamp of the device referenced to a single time reference, based on the clock rate and the clock offset calculated by the server for the concerned device.

Such a synchronization is advantageous in that it effectively implements a simple conversion, from local timestamp to time t, based on local transmission and reception measurement packets and clock rates and clock offsets calculated therefrom, from local clocks to a single time reference.

In embodiments, wherein preferably the devices are anchors for a RTLS, the method comprises the further steps of:

for each respective of the devices, sending, by the server, the respective calculated clock rate and the respective calculated clock offset to the respective device, preferably via the second communication means;

for each respective of the devices, controlling the device to transmit a broadcast packet via said wireless connection means and to thereby generate a respective local broadcast transmission timestamp based on the respective local clock of the respective device, wherein the broadcast packet comprises at least the respective calculated clock rate of the device, the respective clock offset of the device, and the respective local broadcast transmission timestamp;

upon receipt of at least three respective of said broadcast packets of three respective devices via said wireless connection means by a tag within range of said at least three devices, causing the tag to generate respective local broadcast reception timestamps based on a local tag clock comprised in the tag;

wherein the tag has access to coordinates of each of the plurality of devices, and wherein the device is configured to, upon receipt of said at least three respective broadcast packets, determine its location based on at least the respective coordinates, the respective clock rates, the respective clock offsets, the respective local broadcast transmission timestamp and the respective local broadcast reception timestamps associated with the at least three respective devices.

In such embodiments, the broadcast packets may be considered ephemeris data, analogous to ephemeris data known for GPS and similar GNSS technologies such as GLONASS, BeiDou and Galileo. Thereby, the tag merely receives broadcast packets, without being required to send any packet such as a blink packet or, equivalently, a tag message. This is advantageous in that the tag is not required to send or even identify itself with respect to the plurality of anchors, leading to improved scalability with increased number of tags, wherein a large number of tags may use the plurality of anchors for localization purposes without any interference being caused. Such approach may be referred to as reversed TDOA, since the time differences of arrival may be calculated (at least) at the level of the tag. This contrasts with the regular TDOA approach, wherein the time difference of arrival are calculated (at least) at the side of the server and/or the devices.

In embodiments, the coordinates may relate to 2D coordinates, e.g., in the form (x,y), and the 2D location of a tag may be determined based on the broadcast packets of at least three anchors.

In embodiments, the coordinates may relate to 3D coordinates, e.g., in the form (x,y,z), and the 3D location of a tag may be determined based on the broadcast packets of at least four anchors.

In embodiments, wherein the devices may or may not be anchors for a RTLS, the method comprises the further steps of:

for each respective of the devices, sending, by the server, the respective calculated clock rate and the respective calculated clock offset to the respective device, preferably via the second communication means;

for each respective of the devices, controlling the device to transmit a broadcast packet via said wireless connection means and to thereby generate a respective local broadcast transmission timestamp based on the respective local clock of the respective device, wherein the broadcast packet comprises at least the respective calculated clock rate of the device, the respective clock offset of the device, and the respective local broadcast transmission timestamp;

upon receipt of at least three respective of said broadcast packets of three respective devices via said wireless connection means by a further device within range of said at least three devices, causing the further device to generate respective local broadcast reception timestamps based on a local further device clock comprised in the further device;

wherein the further device is configured to and/or controlled by the server to, upon receipt of said at least three respective broadcast packets:

send the generated local broadcast reception timestamps to the server, e.g., via the second communication means, to allow calculation of the clock rate and clock offset of the further device by the server; and/or determine its clock rate and clock offset based on at least the respective clock rates, the respective clock offsets, the respective local broadcast transmission timestamp, the respective local broadcast reception timestamps associated with the at least three respective devices, and coordinates of the at least three respective devices.

Such embodiments provide the advantage that a further device, which may be a tag or an anchor or any other type of device, may be synchronized to the reference clock of a plurality of devices that are already synchronization, allowing for an incremental synchronization.

In embodiments, the clock synchronization is carried out for a first subgroup of said plurality of electronic devices associated with a first set of clock rates and clock offsets for each device of the first subgroup and for a second subgroup of said plurality of electronic devices associated with a second set of clock rates and clock offsets for each device of the second subgroup. This has the advantage of scalability in number of devices. It allows a large number of devices to be divided in multiple, possibly overlapping, groups of devices, enhancing flexibility. This allows to synchronize each group of anchors separately from each other. In embodiments where the devices are used as anchors for positioning, the positioning can then, e.g., be based on combining multiple time-difference from several anchor groups as long as each time-difference is situated in the same anchor group. In related embodiments, at least one device belonging to the first subgroup also belongs to the second subgroup. This has the advantage of, while not being strictly necessary, providing potentially enhanced geographic "coverage" through the combination of first and second subgroup. Related, this may improve the quality of handovers between subgroups. As is clear to the skilled person, each subgroup may be identified with a respective identifier, and geographic coverage may relate to defining different channels according to a reuse factor.

In embodiments, the devices are anchors for a RTLS, and the method comprises the further steps of:

determining a first time of arrival of a tag message received at the first anchor;

determining a second time of arrival of the tag message received at the second anchor;

determining a third time of arrival of the tag message received at a third anchor; and determining a tag location associated with the tag message based at least on the first time of arrival, the second time of arrival, the third time of arrival, the clock rates and the clock offsets calculated for the first, second and third anchor, and coordinates of the first, second and third anchor, wherein said determining is preferably based on time-difference-of-arrival.

In such embodiments, relating to TDOA localization, clock synchronization is advantageously applied for localization, which is known to depend critically on the accuracy of internal clock synchronization of the devices being the anchors. Hereby, it suffices to have the tag send a tag message, or, equivalently, a blink packet, to determine the location, which allows for a simple implementation of the tag, with wireless transmission means yet without requiring wireless reception means or calculations at the level of the tag, leading to reduced power consumption and, related, increased battery life in cases where the tag is battery-powered.

In embodiments with a first and second subgroup of devices, the devices of the first and second subgroup are anchors for a RTLS, wherein the method comprises determining, based on the first set of clock rates and clock offsets, a first time difference of arrival with respect to a first and second time of arrival of a tag message received at a respective first and second anchor of the first subgroup;

determining, based on the second set of clock rates and clock offsets, a second time difference of arrival with respect to a third and fourth time of arrival of the tag message received at a respective third and fourth anchor being anchors of the second subgroup;

determining a tag location associated with the tag message based on said first time difference of arrival, said second time difference of arrival, and coordinates of the first, second, third and fourth anchor.

This has the advantage of improved geographic coverage, while maintaining flexibility in positioning of the anchors. If the number of measurements available is not sufficient to synchronize the entire group of anchors, simple modifications of the algorithm may allow to divide and synchronize each connected subgroups individually. This adds robustness to the algorithm, whereby a single anchor failure does not lead to a synchronization failure in the entire synchronization domain.

In embodiments, said wireless communication means relates to UWB.

In embodiments, the second communication means is a cable connecting the devices to the server according to a bus topology, preferably relating to Ethernet, wherein more preferably the second communication means relates to power of Ethernet for powering at least one of the devices. This is advantageous as it provides a very reliable communication means with minimal risk of interference with the wireless communication means. Moreover, in embodiments with power over Ethernet, a single connection may provide each device with both power and second communication means. In alternative embodiments, the second communication means relates to a second wireless communication means, e.g., Wi-Fi, 3G, 4G, 5G, HDSPA, LTE, RF, NFC, IEEE 802.11a, b, g, n, ac, or ad, Bluetooth®, WiMAX®, ZigBee®, or UWB, which may be applied for connecting at least one, or even all of the devices, to the server. In such cases, interference between the first and second communication means may be prevented with interference prevention means known to the skilled person such as any or any combination of time division multiplexing, wavelength division multiplexing, code division multiplexing, etc.

In embodiments, at least one device comprises a means for detecting motion and/or dislocation, preferably one or more of an accelerometer, a gyroscope, a magnetometer, a pressure sensor, and/or an IMU. This is advantageous since it allows to deal with changes in the environment. Particularly, it enables to distinguish between device movement and temporarily blocked line-of-sight. This is particularly important for RTLS, where apart from tag movement also movement of anchors can be taken into consideration.

In embodiments, the calculation of clock rates and clock offsets comprises estimation of the clock rates and/or the clock offsets. In particular, the clock offsets and clock rates may be derived from a set of equations comprising the values of local transmission timestamps and local reception timestamps as known, and the clock offsets and/or clock rates as unknowns. In embodiments, this estimation comprises applying any or any combination of least squares algorithm, least absolute deviation, etc.

In embodiments, the system relates to a positioning system consisting of a group of N anchors. Each anchor has its own dedicated clock, with an unknown drift and time offset. In preferred embodiments, wherein the main positioning technique is any of time-difference-of-arrival (TDOA) or reversed TDOA, it is required that the timestamps of the different anchors are mapped in a single time reference frame. If this requirement is satisfied, it becomes possible to calculate the time-difference-of-arrival between anchor pairs. These time differences are then used as input for a positioning algorithm, which may in principle be any positioning algorithm known to the skilled person and/or any or any combination of TDOA or reversed TDOA.

In embodiments, the invention may relate to one or more of following features and/or provide one or more of following benefits:

The synchronization allows to centrally synchronize the drift and offsets of all the device clocks on a central processing unit. This allows to keep the devices relatively low-complex, as they can be unaware of the synchronization algorithm. The devices only need to forward their received packages and transmit a blink packet when they are instructed to.

The synchronization requires no additional input information, such as distances and/or time-of-flight between device pairs.

The synchronization may comprise self-calibrating means, configured to dynamically detect which devices are neighbours, and dynamically estimate the time of flight between device pairs. With such means, when the time of flight changes, either due to movement of an device or a change in the environment (humidity, blocking obstacles between devices, . . . ), the estimation will automatically be adjusted.

The synchronization may comprise distance estimation means. As is clear to the skilled person, by synchronizing the devices, the synchronization algorithm is inherently enabled to estimate the distances between the devices. The distance estimation means may be configured to update distance estimations according to some pre-determined schedule allowing fast and robust detection of device movement. In embodiments, this is supplemented with and/or replaced by data from a means for detecting motion or dislocation comprised in one or more of the devices. Hereby, the means may contribute to distinguishing between device movement and temporarily blocked line-of-sight.

As the distances between the devices are not required as input parameters to the synchronization, the synchronization may advantageously comprise validation means for assessing the quality of the synchronization estimate. Hereby, known distances between devices may be used as a validation metric of the quality of the synchronization estimate.

As the synchronization does not require line-of-sight between devices, it only requires a certain amount of available links between devices that show a low variance in time-of-flight.

The synchronization is scalable in number of devices. The synchronization may comprise group defining means for dividing the plurality of devices in multiple, possibly overlapping, groups of devices. This enables to synchronize each group of devices separately from each other. The application, e.g., a positioning algorithm, can then combine multiple inputs, e.g., time-difference measurements, from several device groups as long as each input, e.g., each time-difference, is situated in the same device group.

The synchronization may include means to handle clock overflow, so that resetting or adjusting the local clocks of the devices is no longer necessitated. The local device timestamps can advantageously be corrected in post-processing on the central processing unit using the synchronization results.

The synchronization may include means for detecting and rejecting outliers based on previous measurements. These means need only be included centrally, alleviating the burden on the different devices.

To handle the case where the number of measurements available is not sufficient to synchronize the entire group of devices, the synchronization algorithm may comprise means to divide and synchronize each connected subgroup individually. This adds robustness to the synchronization, wherein failure of a single device does not cause synchronization failure for the entire synchronization domain.

Example 1

FIG. 1 shows an example embodiment of the present invention. Particularly FIG. 1 shows a system 4 comprising a server 2 and four electronic devices 1a, 1b, 1c, 1d. Each device comprises a respective local clock having a respective clock rate and a respective clock offset; wireless communication means 11 for transmitting and receiving packets to and from the other devices 1; and second communication means 12 for connecting to said server 2. In this example, the first communication means relates to UWB whereas the second communication means relates to a cabled Ethernet connection.

The server 2 is configured for performing a method for clock synchronization of said plurality of electronic devices 1. First, for each respective of the devices 1a, 1b, 1c, 1d, the server controls the device 1 to transmit at least two respective measurement packets 3 via said wireless connection means 11 and generate respective local transmission timestamps based on the respective local clock of the device 1. In FIG. 1, this is shown for device 1*b*, transmitting a measurement packet 3*b*, generating a local transmission timestamp based on its clock, and device 1*c*, transmitting a measurement packet 3*c* and also generating a local transmission timestamp based on its clock.

For the transmitted measurement packet 3*b*, device 1*d*, upon receipt of the transmitted measurement packet 3*b*, generates a local reception timestamp based on its local clock. For the transmitted measurement packet 3*c*, both device 1*a* and 1*d*, upon receipt of the transmitted measurement packet 3*c*, each generate a local reception timestamp based on their respective local clock.

For each device 1 and for each respective of said transmitted measurement packets 3, the transmitting device 1 is controlled to transmit the local transmission and reception timestamps to the server 2 via the second connection means 12. In the example as shown, device 1*b* and 1*c* both transmit their respective local transmission timestamp to the server, whereas device 1*d* transmits two local reception timestamps to the server 2, i.e. one for measurement packet 3*b* and one for measurement packet 3*c*.

In a next step, the server 2 calculates the clock rates and the clock offsets of each of the devices 1*a*-1*d* based on the received local transmission timestamps and the received local reception timestamps, including those not shown in FIG. 1. In this example, the calculating of the clock rates and the clock offsets is performed after reception of each of the generated local transmission timestamps and each of said generated local reception timestamps.

Example 2

In this example, which may advantageously be combined with Example 1, a system being an RTLS is considered, wherein the devices act as anchors. Note, however, that the clock synchronization described in this example may equally be applied to any suitable application where clock synchronization is important such as: network and packet monitoring, network security, authentication protocols and real-time media streaming.

Definitions $\tau_i$: timestamp on anchor i
$\tau_M$: maximal timestamp on anchors before overflow
$t_i$: time in mm on anchor i (assuming the signals travel according to the speed of light)
c: the nominal conversion rate from timestamps to time in mm System Model
Local Time and Synchronized Time
The following model is assumed for the local time on each anchor:

$$t(\tau_i) = \gamma_i \tau_i - \delta_i, \qquad (1)$$

where
$t(\tau_i)$ is the timestamp $\tau_i$ referenced to a single time reference,
$\tau_i$ is the local time on anchor i,
$\gamma_i$ is the clock rate,
$\delta_i$ is the clock offset.
The parameters $\gamma_i$ and $\delta_i$ (i=1, . . . , N) are the unknown variables. Once these parameters are known, a local timestamp r, may always be transformed to its corresponding time in the reference frame $t(\tau_i)$.

As in this example, the local timestamps $\tau_i$ overflow once they reach their maximal timestamp $\tau_M$, it is required to also impose a certain reference timestamp $\tau_{i,ref}$ which is used for the overflow compensation of $\tau_i$. This happens according to the following formula $$[\tau_i]_{\tau_{i,ref}} \overset{\text{def}}{=} (\tau_i - \tau_{i,ref}) \% \tau_M,$$

where it has to be ensured that $\tau_{i,ref}$, $\gamma_i$ and $\delta_i$ are updated before the time interval $[\tau_{i,ref}, \tau_{i,ref} + \tau_M]$ is expired. Alternatively or additionally, it may be assumed that $\tau_{1,i}^T$ and $\tau_{2,i}^T$ are both lying inside a time span of duration $\tau_M$, and $\tau_{1,j}^A$ and $\tau_{2,j}^A$ inside a time span of duration $\tau_M$, which allows a simpler notation, with, e.g., $$\Delta\tau_i^T \overset{\text{def}}{=} [\tau_{2,i}^T - \tau_{1,i}^T]_0.$$

$$\Delta\tau_j^A \overset{\text{def}}{=} [\tau_{2,j}^A - \tau_{1,j}^A]_0.$$

So equation (1) is changed to $$t(\tau_i) = \gamma_i [\tau_i]_{\tau_{i,ref}} - \delta_i. \qquad (2)$$

Note: To address the limited accuracy of each physical clock, in embodiments, the parameters $\gamma_i$ and $\delta_i$ are recalculated after a pre-determined time interval smaller than $\tau_M$ which may be chosen in view of the quality of the hardware clocks.

Synchronization Measurement

In order to receive measurements and to keep the anchors accurately in sync, the anchors periodically transmit an UWB packet. The transmitting anchor forward its local transmission time to the central processing unit, or, equivalently, the server, through Ethernet. The anchors that have wirelessly received this UWB packet add their local arrival time to the packet and forward this information through Ethernet to the central processing unit. The central processing unit aggregates these packets based on the transmitting anchor identification number and the blink index number. These aggregated packets may be referred to as a synchronization measurement. It is based on these measurements that synchronization of the anchors is provided.

In preferred embodiments, each anchor has transmitted and received one or several measurements in a certain timespan. The exact number and the exact timing of these measurements is of lesser importance to the algorithm. It is possible for separate anchors that have no common neighbours, to transmit their UWB packet approximately at the same time as both measurements will have no influence on each other.

In the remaining part of this example, it is indicated to which measurement a timestamp corresponds by using an additional subindex k. Furthermore, it is explicitly indicated if the measured timestamp is a transmission timestamp (T) or an arrival timestamp (A). For example, the following notation for a local timestamp $$\tau_{k,i}^T$$

denotes that it is a local transmission timestamp corresponding to the $k^{th}$ measurement that is transmitted by anchor i. Additionally, $$\tau_{k,i,j}^A$$

is the local reception timestamp corresponding to the $k^{th}$ measurement that is transmitted by anchor i and received by anchor j. In this document, this is denoted $$\tau_{k,j}{}^{A}$$

without explicit mention of the transmitting anchor i.

Assumptions

Rate Equations

With multiple measurements available from anchor i to anchor j, the following relationship between the measured timestamps can be expressed $$t(\tau_{2,i}{}^{T})-t(\tau_{1,i}{}^{T})=t(\tau_{2,j}{}^{A})-t(\tau_{1,j}{}^{A}).$$

Using equation (2), this equation can be further simplified as follows.

$$\gamma_i([\tau_{2,i}{}^{T}-\tau_{1,i}{}^{T}]_0)=\gamma_j([\tau_{2,j}{}^{A}-\tau_{1,j}{}^{A}]_0).$$

$$\gamma_i\Delta\tau_i{}^{T}=\gamma_j\Delta\tau_j{}^{A}$$

assuming that $\tau_{1,i}{}^{T}$ and $\tau_{2,i}{}^{T}$ are both lying inside a time span of duration $\tau_M$, and $\tau_{1,j}{}^{A}$ and $\tau_{2,j}{}^{A}$ inside a time span of duration $\tau_M$, and where $$\Delta\tau_i{}^{T} \stackrel{def}{=} [\tau_{2,i}{}^{T}-\tau_{1,i}{}^{T}]_0.$$

$$\Delta\tau_j{}^{A} \stackrel{def}{=} [\tau_{2,j}{}^{A}-\tau_{1,j}{}^{A}]_0.$$

It is assumed that the nominal rate is the mean rate. This means $$\frac{\sum_{i=1}^{N}\gamma_i}{N} = c.$$

These two assumptions allow to write the following set of equations $$A\begin{bmatrix} \gamma_1 \\ \gamma_2 \\ \vdots \\ \gamma_{N-1} \end{bmatrix} = b,$$

Where $$A = \begin{bmatrix} & (1) & (2) & \dots & (i) & \dots & (j) & \dots & (N-1) \\ \vdots & \vdots & \vdots & \ddots & \vdots & \vdots & \vdots & \vdots & \vdots \\ (i,j) & 0 & 0 & \dots & \Delta\tau_i^T & \dots & -\Delta\tau_j^A & \dots & 0 \\ \vdots & \vdots & \vdots & \ddots & \vdots & \vdots & \vdots & \vdots & \vdots \\ (N,j) & -\Delta\tau_N^T & -\Delta\tau_N^T & \dots & -\Delta\tau_N^T & \dots & -\Delta\tau_j^T-\Delta\tau_N^T & \dots & -\Delta\tau_N^T \\ \vdots & \vdots & \vdots & \ddots & \vdots & \vdots & \vdots & \vdots & \vdots \\ (i,N) & \Delta\tau_N^A & \Delta\tau_N^A & \dots & \Delta\tau_i^T+\Delta\tau_N^A & \dots & \Delta\tau_N^A & \dots & \Delta\tau_N^A \\ \vdots & \vdots & \vdots & \vdots & \vdots & \vdots & \vdots & \vdots & \vdots \end{bmatrix}$$

$$b = \begin{bmatrix} \vdots & \vdots \\ (i,j) & 0 \\ \vdots & \vdots \\ (N,j) & -Nc\Delta\tau_N^T \\ \vdots & \vdots \\ (i,N) & Nc\Delta\tau_N^A \\ \vdots & \vdots \end{bmatrix}$$

This set of equations can be solved according to a least squares algorithm.

Offset Equations

It is assumed that the time of flight from anchor i to anchor j is identical to the time of flight from anchor j to anchor i. This leads to the following equation $$t(\tau_{1,j}{}^{A})-t(\tau_{1,i}{}^{T})=t(\tau_{2,i}{}^{A})-t(\tau_{2,j}{}^{T}).$$

This equation can be simplified to $$\delta_j - \delta_i =$$

$$\frac{1}{2}\left(\gamma_j\left([\tau_{1,j}^A]_{\tau_{j,ref}}+[\tau_{2,j}^T]_{\tau_{j,ref}}\right)-\gamma_i\left([\tau_{1,i}^T]_{\tau_{i,ref}}+[\tau_{2,i}^A]_{\tau_{i,ref}}\right)\right) \stackrel{def}{=} O_{i,j}.$$

As only one reference time frame is required, there is freedom to set one of the offsets equal to 0. Therefore, following relationship is used.

$$\delta_N=0.$$

These two assumptions lead to the following set of equations:

$$D\begin{bmatrix} \delta_1 \\ \delta_2 \\ \vdots \\ \delta_{N-1} \end{bmatrix} = e$$

where $$D = \begin{bmatrix} & (1) & (2) & \dots & (i) & \dots & (j) & \dots & (N-1) \\ \vdots & \vdots & \vdots & \ddots & \vdots & \vdots & \vdots & \vdots & \vdots \\ (i,j) & 0 & 0 & \dots & -1 & \dots & 1 & \dots & 0 \\ \vdots & \vdots & \vdots & \ddots & \vdots & \vdots & \vdots & \vdots & \vdots \\ (N,j) & 0 & 0 & \dots & 0 & \dots & 1 & \dots & 0 \\ \vdots & \vdots & \vdots & \ddots & \vdots & \vdots & \vdots & \vdots & \vdots \\ (i,N) & 0 & 0 & \dots & -1 & \dots & 0 & \dots & 0 \\ \vdots & \vdots & \vdots & \vdots & \vdots & \vdots & \vdots & \vdots & \vdots \end{bmatrix},$$

-continued $$e = \begin{bmatrix} \vdots & \vdots \\ (i,\,j) & o_{i,j} \\ \vdots & \vdots \\ (N,\,j) & o_{N,j} \\ \vdots & \vdots \\ (i,\,N) & o_{i,N} \\ \vdots & \vdots \end{bmatrix}.$$

Together, the rate equations and offset equations allow to calculate, from a set of local transmission and reception timestamps, the clock rates and the clock offsets for each of the N anchors.

Example 3

Figure 2:
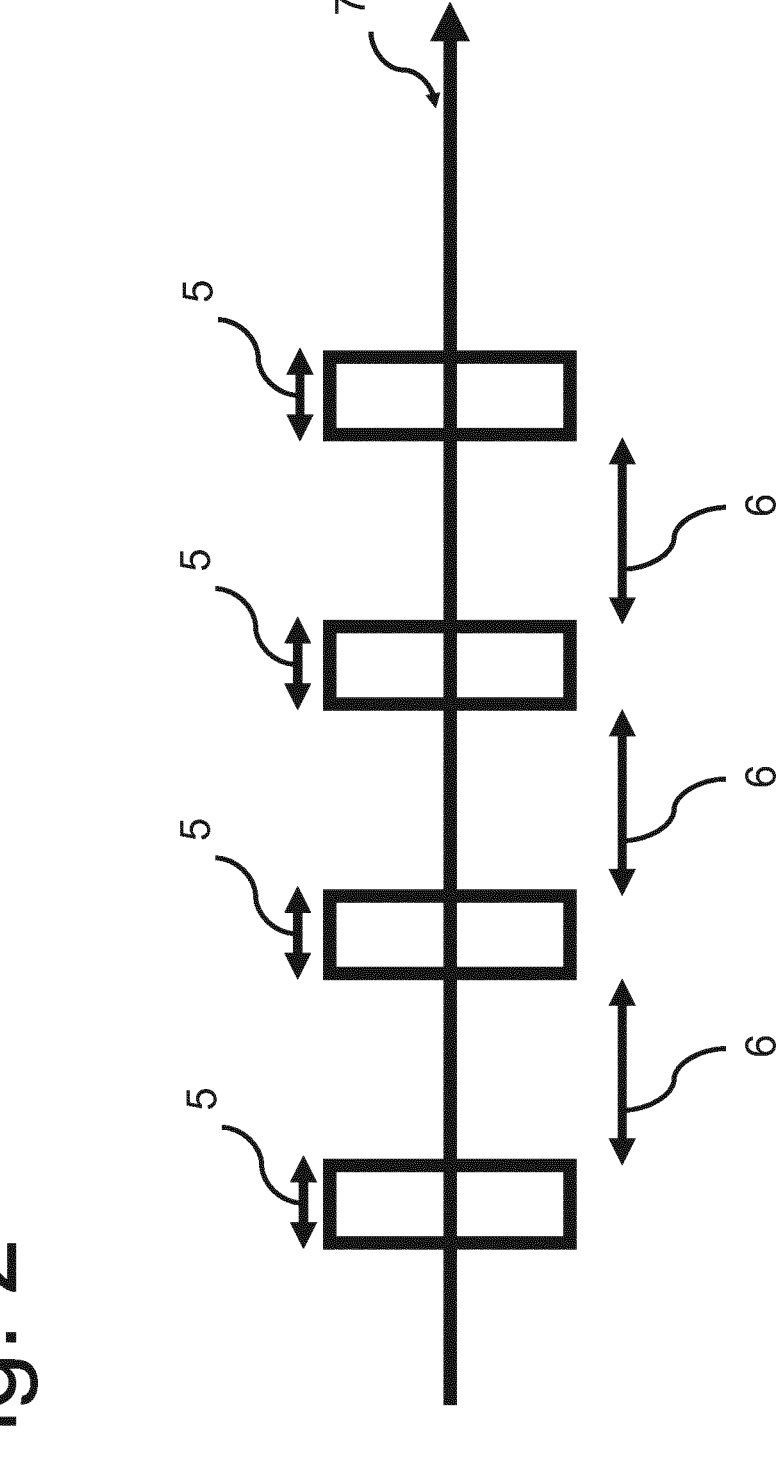
FIG. 2 shows a timeline relating to TDOA and reversed TDOA according to example embodiments.

FIG. 2 shows a timeline (7) relating to TDOA and reversed TDOA according to example embodiments of the invention. Time is divided according to alternations of first time periods of a first duration (5) and second time periods of a second duration (6). During the first time periods, clock synchronization is performed according to the invention among a plurality of anchors in a RTLS. During the second time periods, the anchors are assumed synchronized.

The first duration (5) is preferably smaller than the second duration (6), preferably less than 10% of the duration (6). The sum of the first duration and second duration is chosen in view of the stability of the clocks of the anchors, and/or, in view of the desired update rate, as in embodiments with reversed TDOA, the update rate may be inversely proportional with the sum of the first duration and the second duration.

In embodiments, the second time periods are used for TDOA-based localization of a tag transmit a tag message for localization, wherein the tag is configured to transmit during second time periods but preferably not during first time periods. In related embodiments, which may advantageously be combined with use of the second time periods for TDOA-based localization, the first time periods may be used for reversed-TDOA-based localization of a tag, wherein a tag does not transmit packet yet is localized based on reception of a sufficient number of broadcast packets and/or measurement packets by the tag.

In this example, first time periods of a first duration (5) and second time periods of a second duration (6) are alternated according to uniform durations (5, 6). However, in other embodiments, non-uniform periods may be considered with respect to both the first and the second duration. This concludes Example 3.

In this example, the devices are anchors in a RTLS. However, in alternative embodiments, the same first and second periods may be applied to ensure clock synchronization for purposes other than localization, wherein the first periods may be utilized for transmission by the plurality of devices, and the second periods may be utilized for transmission by further devices, thereby preventing interference between the devices and the one or more further device.

While embodiments are described herein in relation to localization, improved clock synchronization may be applied to any suitable application where clock synchronization is important such as: network and packet monitoring, network security, authentication protocols and real-time media streaming.

The invention claimed is:

1. A method for clock synchronization of a plurality of electronic devices (1), said plurality comprising at least three devices, wherein each of the plurality of devices (1) comprises:

a respective local clock having a respective clock rate and a respective clock offset;

wireless communication means (11) for transmitting and receiving packets to and from the other devices of said plurality of devices;

second communication means (12) for connecting to a server (2);

said method comprising the steps of:

for each respective one of the devices, controlling the device to transmit at least two respective measurement packets (3) via said wireless connection means (11) and generate respective local transmission timestamps based on the respective local clock of the device;

for each respective of said transmitted measurement packets, controlling at least one device different from the transmitting device to, upon receipt of the transmitted measurement packet (3) via said wireless connection means (11), generate a respective local reception timestamp based on the respective local clock of the respective device;

for each device and for each respective of said transmitted measurement packets (3), controlling the transmitting device to transmit the local transmission timestamp to the server (2) via the second connection means (12);

for each respective of said transmitted measurement packets (3), controlling the at least one receiving device to transmit the local reception timestamp to the server (2) via the second connection means (12);

calculating, by the server (2), the clock rates and the clock offsets of each of the plurality of respective devices based on the received local transmission timestamps and the received local reception timestamps;

wherein said calculating of the clock rates and the clock offsets is performed after reception, by the server (2), of each of said generated local transmission timestamps and each of said generated local reception timestamps;

wherein said step of calculating the clock rates and the clock offsets comprises the substeps of:

(a) calculating the clock rates of each of the plurality of respective devices based on the received local transmission timestamps and the received local reception timestamps;

(b) calculating the clock offsets of each of the plurality of respective devices based on at least the received local transmission timestamps and the received local reception timestamps;

wherein said substep (b) is carried out after completion of substep (a), and wherein preferably the calculating of the clock offsets is further based on the calculated clock rates; and wherein the calculating of the clock offsets of substep (b) is based on the received local transmission timestamps, the received local reception timestamps and the calculated clock rates solely through coefficients $o_{i,j}$, wherein $o_{i,j}$ is proportional to $\gamma_i([\tau^A_{1,i}]\tau_{i,ref} + [\tau^T_{2,i}]\tau_{i,ref}) - \gamma_i([\tau^T_{1,i}]\tau_{i,ref} + [\tau^A_{2,i}]\tau_{i,ref})$; wherein $\gamma_i$ denotes the clock rate of device i, i=1, . . . , N; wherein N is the number of devices;

$\tau^T{}_{k,i}$ denotes the local transmission timestamp corresponding to the $k^{th}$ measurement packet that is transmitted by device i;

$\tau^A{}_{k,i}$ denotes the local reception timestamp corresponding to the $k^{th}$ measurement that is transmitted by device i and received by device j; and

[$\tau$] $\tau_{i,ref}$ denotes $(\tau_i - \tau_{i,ref})$ module $\tau_M$, wherein $\tau_{i,ref}$ denotes a reference timestamp for overflow compensation of device i, and IM denotes a maximal timestamp relating to overflow.

2. Method according to claim 1, wherein the devices are anchors for a Real-Time Locating System (RTLS), and wherein the method comprises the further steps of:

for each respective of the devices, sending, by the server, the respective calculated clock rate and the respective calculated clock offset to the respective device, preferably via the second communication means (12);

for each respective of the devices, controlling the device to transmit a broadcast packet via said wireless connection means (11) and to thereby generate a respective local broadcast transmission timestamp based on the respective local clock of the respective device, wherein the broadcast packet comprises at least the respective calculated clock rate of the device, the respective clock offset of the device, and the respective local broadcast transmission timestamp; and upon receipt of at least three respective of said broadcast packets of three respective devices (1) via said wireless connection means (11) by a tag within range of said at least three devices (1), causing the tag to generate respective local broadcast reception timestamps based on a local tag clock comprised in the tag;

wherein the tag has access to coordinates of each of the plurality of devices, and wherein the device is configured to, upon receipt of said at least three respective broadcast packets, determine its location based on at least the respective coordinates, the respective clock rates, the respective clock offsets, the respective local broadcast transmission timestamp and the respective local broadcast reception timestamps associated with the at least three respective devices.

3. Method according to claim 2, wherein said tag having access to said coordinates of the devices relates to said respective coordinates being comprised in the respective broadcast packet of the respective device.

4. Method according to claim 1, wherein the method comprises the further steps of receiving, at the server, a local timestamp from one of the devices through said second communication means, wherein said local timestamp is based on the local clock of the device; and calculating, by the server, the time t being the local timestamp of the device referenced to a single time reference, based on the clock rate and the clock offset calculated by the server for the concerned device.

5. Method according to claim 1, wherein the clock synchronization is carried out for a first subgroup of said plurality of electronic devices associated with a first set of clock rates and clock offsets for each device of the first subgroup and for a second subgroup of said plurality of electronic devices associated with a second set of clock rates and clock offsets for each device of the second subgroup, wherein preferably at least one device belonging to the first subgroup also belongs to the second subgroup.

6. Method according to claim 1, wherein the devices are anchors for a Real-Time Locating System (RTLS), and wherein the method comprises the further steps of:

determining a first time of arrival of a tag message received at the first anchor; determining a second time of arrival of the tag message received at the second anchor;

determining a third time of arrival of the tag message received at a third anchor; and determining a tag location associated with the tag message based at least on the first time of arrival, the second time of arrival, the third time of arrival, the clock rates and the clock offsets calculated for the first, second and third anchor, and coordinates of the first, second and third anchor, wherein said determining is preferably based on time-difference-of-arrival.

7. Method according to claim 5, wherein the devices of the first and second subgroup are anchors for a Real-Time Locating System (RTLS), wherein the method comprises determining, based on the first set of clock rates and clock offsets, a first time difference of arrival with respect to a first and second time of arrival of a tag message received at a respective first and second anchor being anchors of the first subgroup;

determining, based on the second set of clock rates and clock offsets, a second time difference of arrival with respect to a third and fourth time of arrival of the tag message received at a respective third and fourth anchor being anchors of the second subgroup; and determining a tag location associated with the tag message based on said first time difference of arrival, said second time difference of arrival, and coordinates of the first, second, third and fourth anchor.

8. Method according to claim 1, wherein said wireless communication means relates to UWB.

9. Method according to claim 1, wherein the second communication means is a cable connecting the devices to the server according to a bus topology, preferably relating to Ethernet, wherein more preferably the second communication means relates to power of Ethernet for powering at least one of the devices.

10. Method according to claim 1, wherein at least one device comprises a means for detecting motion and/or dislocation, preferably one or more of an accelerometer, a gyroscope, a magnetometer, a pressure sensor, and/or an IMU.

11. A system (4) comprising a server (2); and a plurality of electronic devices, said plurality comprising at least three devices, each comprising a respective local clock having a respective clock rate and a respective clock offset;

wireless communication means (11) for transmitting and receiving packets to and from other devices of said plurality of devices; and second communication means (12) for connecting to said server (2);

wherein said server (2) is configured for performing a method for clock synchronization of said plurality of electronic devices, said method comprising the steps of for each respective plurality of devices, controlling the device to transmit at least two respective measurement packets (3) via said wireless connection means (11) and generate respective local transmission timestamps based on the respective local clock of the device;

for each respective of said transmitted measurement packets (3), controlling at least one device different from the transmitting device to, upon receipt of the transmitted measurement packet (3) via said wireless connection means (11), generate a respective local reception timestamp based on the respective local clock of the respective device;

for each device and for each respective of said transmitted measurement packets (3), controlling the transmitting device to transmit the local transmission timestamp to the server (2) via the second connection means (12);

for each respective of said transmitted measurement packets (3), controlling the at least one receiving device to transmit the local reception timestamp to the server (2) via the second connection means (12); and calculating, by the server (2), the clock rates and the clock offsets of each of the plurality of respective devices based on the received local transmission timestamps and the received local reception timestamps, wherein preferably said calculating of the clock rates and the clock offsets is performed after reception of each of said generated local transmission timestamps and each of said generated local reception timestamps;

wherein each of said plurality of devices is configured for performing the steps of:

upon receiving transmission instructions from said server (2) via said second communication means (12), transmitting measurement packets (3) via said wireless connection means (11) and generating respective local transmission timestamps based on the local clock;

upon receiving transmitted measurement packets (3) via said wireless connection means (11), generating respective local reception timestamps based on the local clock; and transmitting the generated local transmission timestamps to the server (2) via the second connection means (12); transmitting the generated local reception timestamps to the server (2) via the second connection means (12);

wherein said step of calculating the clock rates and the clock offsets comprises the substeps of:

(a) calculating the clock rates of each of the plurality of respective devices based on the received local transmission timestamps and the received local reception timestamps;

(b) calculating the clock offsets of each of the plurality of respective devices based on at least the received local transmission timestamps and the received local reception timestamps;

wherein said substep (b) is carried out after completion of substep (a), and wherein preferably the calculating of the clock offsets is further based on the calculated clock rates; and wherein the calculating of the clock offsets of substep (b) is based on the received local transmission timestamps, the received local reception timestamps and the calculated clock rates solely through coefficients $o_{i,j}$, wherein $o_{i,j}$ is proportional to $\gamma_i([\tau^A_{1,i}]\tau_{i,ref} + [\tau^T_{2,i}]\tau_{i,ref}) - \gamma_i([\tau^T_{1,i}]\tau_{i,ref} + [\tau^A_{2,i}]\tau_{i,ref})$;

wherein $\gamma_i$ denotes the clock rate of device i, i=1, . . . , N; wherein N is the number of devices;

$\tau^T_{k,i}$ denotes the local transmission timestamp corresponding to the $k^{th}$ measurement packet that is transmitted by device i;

$\tau^A_{k,i}$ denotes the local reception timestamp corresponding to the $k^{th}$ measurement that is transmitted by device i and received by device j; and $[\tau]$ $\tau_{i,ref}$ denotes $(\tau_i - \tau_{i,ref})$ module $\tau_M$, wherein $\tau_{i,ref}$ denotes a reference timestamp for overflow compensation of device i, and $\tau_M$ denotes a maximal timestamp relating to overflow.

12. A non-transient storage device, comprising computer-executable instructions which, when executed on a processor, cause the processor to perform the method of claim 1.

* * * * *